Oct. 11, 1949.   J. MALDONADO   2,484,631
CONTAINER FOR TORTILLAS AND OTHER HEATED FOOD
Filed July 21, 1947
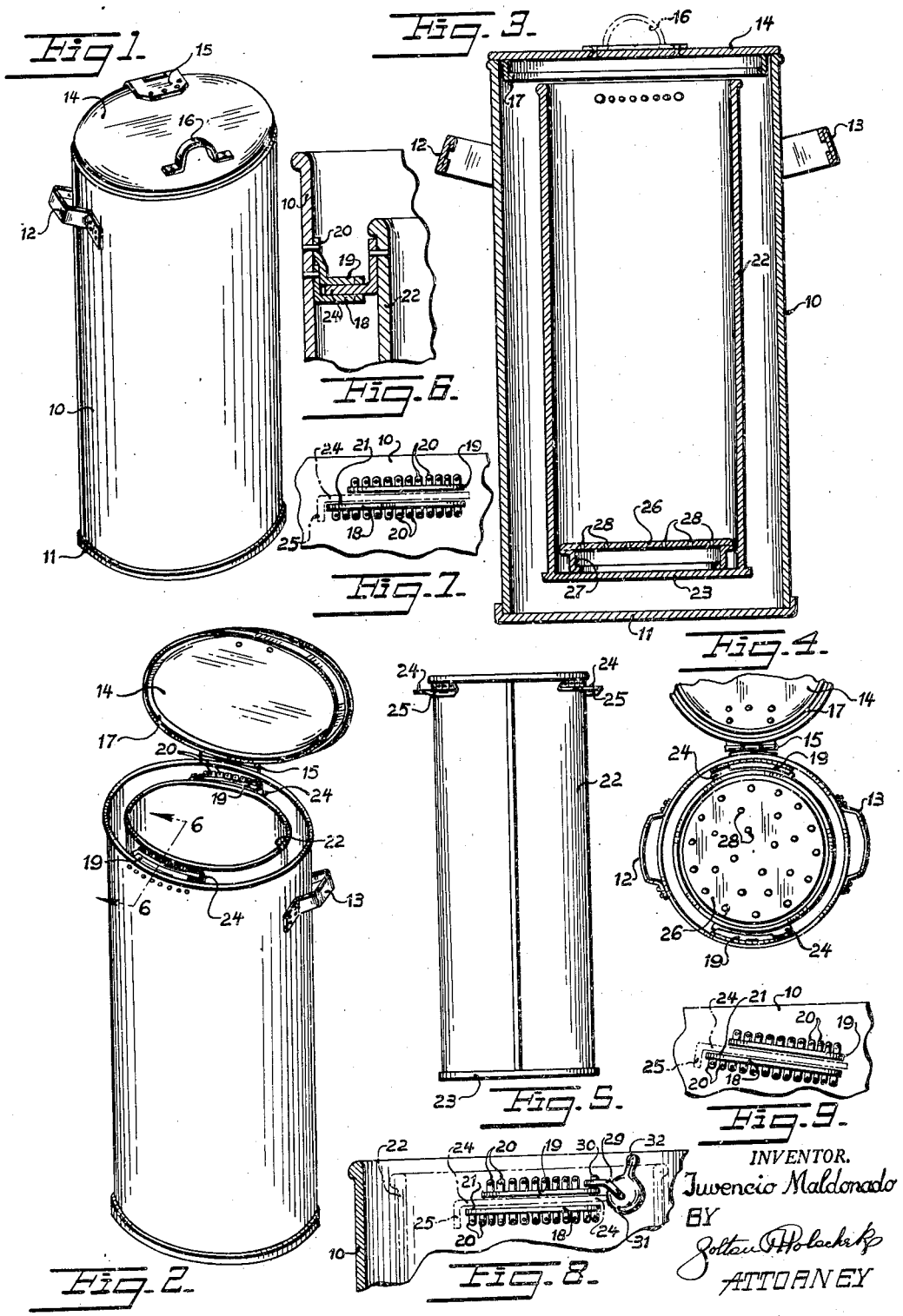
INVENTOR.
Juvencio Maldonado
BY
ATTORNEY Patented Oct. 11, 1949

2,484,631

UNITED STATES PATENT OFFICE 2,484,631

CONTAINER FOR TORTILLAS AND OTHER HEATED FOOD

Juvencio Maldonado, New York, N. Y.

Application July 21, 1947, Serial No. 762,478

1 Claim. (Cl. 220—9)

The present invention relates to containers for tortillas and other heated food articles and it consists in the combinations, constructions and arrangements of parts herein described and claimed.

Generally the invention comprises an outer container adapted to hold a quantity of water and which outer container is adapted to be placed upon a stove or other heating means. The container is provided with a cover and an inner container with means for spacing the inner container from the bottom sides and top of the outer container. Suitable handles are provided for lifting the entire unit and a handle is provided for the cover of the outer container.

A spacing device is positioned at the bottom of the inner container to prevent food from sticking to the bottom thereof. Special means is provided, also, for releasing the inner container from the outer container, said means consisting of a cam adapted to be moved by an integrally formed handle and which cam bears against a projection carried by the side of the inner container, it being understood that the cam is secured to the outer container so as to secure relative movement between the containers. Means is also provided whereby the inner container, upon being properly positioned within the outer container, may not become displaced therefrom.

It is, accordingly, an object of the invention to provide a device of the character described wherein food may be stored in a heated condition within a container which is at all times surrounded by a blanket of heated water.

A further object of the invention is to provide novel means whereby one container may be removably positioned within another in spaced relation from the sides and bottom thereof.

A further object of the invention is to provision of means whereby one container may be removably positioned in spaced relation to another and having means utilizing the force of gravity to prevent accidental displacement of the inner container.

A further object of the invention is the provision of means carried by an outer container for applying force to an inner container to release the same from the outer container.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of an embodiment of the invention.

Fig. 2 is a perspective view of the invention disclosed in Fig. 1 with a cover, forming part of the invention, in open position.

Fig. 3 is an enlarged sectional view of the invention.

Fig. 4 is a plan view of the device shown in Fig. 2.

Fig. 5 is a side elevational view of an inner container forming a part of the invention.

Fig. 6 is an enlarged sectional view taken along line 6—6 of Fig. 2.

Fig. 7 is a fragmentary elevational view illustrating certain features of the invention.

Figs. 8 and 9 are views similar to Fig. 7 but showing modified forms the invention may assume.

Referring more particularly to the drawings, there is shown therein a storage apparatus for heated food articles comprising an outer container 10 of generally cylindrical shape having a flat bottom 11 and a pair of diametrically opposed handles 12 and 13. A cover 14 is provided for the outer container 10 and is hinged to the arm as indicated at 15. It also is provided with an operating handle 16. The cover also is provided with a dependent annular flange 17 adapted to closely align itself with the upper end of the container to insure a close fit therewith.

The outer container is provided adjacent its upper end with a pair of inwardly extending shelf members 18 surmounting which in spaced parallel relation in each case is a guide member 19.

The members 18 and 19 are fastened to the inner side of the container 10 by means of integrally formed ears 20 which may be riveted or otherwise attached to the container. It will be noted that the guide members 19 are of less length than the shelf member 18, thus leaving an exposed portion 21 upon each shelf member.

An inner container 22 is provided with a bottom 23 and is of substantially cylindrical shape. The inner container is provided at its upper end with a pair of diametrically opposed outwardly extending detents 24 which are provided with dependent integrally formed stops 25.

A plate 26 having a dependent annular rest 27 and perforations as indicated at 28 is adapted to be placed upon the bottom 23 of the container 22.

In operation, the device is particularly suitable for maintaining food articles such as, tortillas, and other foods in a heated condition. In order to effect this result, water is first placed within the container 10 whereupon it is heated by placing the container over a source of heat. The inner container is then lowered into the outer container and the detents 24 come into contact with the exposed portions 21 of the shelf members 18. The inner container is then rotated until the detents 24, passing between the shelf members 18 and the guide members 19, reach a position where the stops 25 come into contact with the shelf members 18. This action will position the inner container 33 in spaced relation with the outer container 10 and provide a wall of heated water between the respective sides and the respective bottoms of the containers.

The plate 26 may then be placed within the container 22 and heated foodstuffs placed thereon. The plate 26 will prevent such food articles from adhering to the bottom of the container 22. The cover 14 is then closed and it will be apparent that so long as heat is applied to the outer container such food articles will be maintained in a heated condition.

In the form of the invention disclosed in Fig. 8, it will be seen that there is provided an arm 29 riveted or otherwise fastened to a guide member 19 as indicated at 30. To the outer end of the arm 29 is pivoted a cam 31 having an integrally formed operating handle 32.

In the operation of this device, it will be apparent that when the container 22 has been associated with the container 10 for a period of time, there will be a tendency for the detents 24 to adhere to the shelf members 18 and guide members 19. By moving the handle 32 of the cam 31 in a clockwise direction, as viewed in Fig. 8, it will be apparent that the cammed surfaces will bear against the detent 24 to urge the same out of engagement with the members 18 and 19.

In the form of the invention disclosed in Fig. 9, it will be apparent that the members 18 and 19, while remaining in parallel spaced relation, slant downwardly from the exposed portion 21. The detent 24 is likewise slanted in the same direction.

It will be seen that when the inner container is lowered into the outer container, in this latter form of the invention that, upon the detent 24 reaching the exposed portion 21 of the shelf member 18, the shelf member and the container 22 will tend to rotate by gravity until the dependent stop members 25 come into contact with the shelf members 18.

It will be understood that the structure disclosed in Fig. 8 may be also utilized with the structure disclosed in Fig. 9.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A device of the character described comprising, an outer cylindrical container provided with an enclosed bottom and an open top, a closure for said opening top hinged to the vertical wall of said container, a horizontal track secured about the inner circumference of the container at a spaced distance below the open end thereof, diametrically opposed interruptions in said track, an inner cylindrical container having an enclosed bottom and an open top, a horizontal detent formed about the upper outer circumference of said inner container, said detent removably engageable in said track to removably suspend the inner container entirely within the outer container, stop members on said detent engageable with said track at the points of joinder with the interrupted portions thereof, a perforated plate provided with annular rests on the under side thereof seated in the bottom of said inner container, a lever hinged to the inner wall of the outer container adjacent an interrupted portion of the track therein, and a cam head carried by said lever movable into abutting contact with that end of said detent remote to said stop for the purpose described.

JUVENCIO MALDONADO.

REFERENCES CITED

The following references are of record in the file of this patent:

UNITED STATES PATENTS

| Number | Name | Date |
|---|---|---|
| 247,526 | Ackermann | Sept. 27, 1881 |
| 1,580,541 | Sherman | Apr. 13, 1926 |
| 1,727,938 | Rantsch | Sept. 10, 1929 |
| 2,225,448 | Hamilton | Dec. 17, 1940 |
| 2,333,890 | Russell | Nov. 9, 1943 |

FOREIGN PATENTS

| Number | Country | Date |
|---|---|---|
| 9,912 | Great Britain | Apr. 22, 1914 |